US012761749B2

(12) United States Patent
Zhang et al.

(10) Patent No.: US 12,761,749 B2
(45) Date of Patent: Oct. 13, 2026

(54) CAPACITIVE SCREENS AND METHODS FOR INTERACTION WITH A STYLUS

(71) Applicant: CHIPSEMI SEMICONDUCTOR (NINGBO) CO., LTD., Ningbo (CN)

(72) Inventors: Yaoguo Zhang, Ningbo (CN); Haifeng Shen, Ningbo (CN); Bo Xia, Ningbo (CN); Bo Nie, Ningbo (CN); Congqing Yu, Ningbo (CN); Guofan Cheng, Ningbo (CN); Jui-Ming Ni, Ningbo (CN)

( * ) Notice: Subject to any disclaimer, the term of this patent is extended or adjusted under 35 U.S.C. 154(b) by 0 days.

(21) Appl. No.: 18/916,743

(22) Filed: Oct. 16, 2024

(65) Prior Publication Data

US 2025/0068272 A1 Feb. 27, 2025

Related U.S. Application Data

(63) Continuation of application No. PCT/CN2023/071152, filed on Jan. 8, 2023.

(30) Foreign Application Priority Data

Jun. 24, 2022 (CN) ......................... 202210720988.3

(51) Int. Cl.

| | |
|---|---|
| ***G06F 3/041*** | (2006.01) |
| ***G06F 3/044*** | (2006.01) |
| ***G06F 3/046*** | (2006.01) |

(52) U.S. Cl.

CPC ........ *G06F 3/04162* (2019.05); *G06F 3/0441* (2019.05); *G06F 3/0442* (2019.05); *G06F 3/046* (2013.01); *G06F 2203/04101* (2013.01)

(58) Field of Classification Search

CPC .. G06F 3/04162; G06F 3/0441; G06F 3/0442; G06F 3/046; G06F 2203/04101

See application file for complete search history.

(56) References Cited

U.S. PATENT DOCUMENTS

| | | | | |
|---|---|---|---|---|
| 2011/0298748 | A1 | 12/2011 | Chen et al. | |
| 2020/0050350 | A1* | 2/2020 | Lee .................... | G06F 3/04883 |

FOREIGN PATENT DOCUMENTS

| | | | |
|---|---|---|---|
| CN | 202854775 | U | 4/2013 |
| CN | 104423756 | A | 3/2015 |
| CN | 110456926 | A | 11/2019 |
| CN | 114816139 | A | 7/2022 |
| JP | 2015005266 | A | 1/2015 |

OTHER PUBLICATIONS

The international search report received in the counterpart international application PCT/CN2023/071152, mailed on May 10, 2023.

* cited by examiner

*Primary Examiner* — Lisa S Landis

(57) ABSTRACT

The present application discloses a capacitive screen, a method for its interaction with a stylus, and a storage medium. The capacitive screen includes a touch control chip and a screen coil. The touch chip generates a first current signal, which the screen coil, integrated as a metal coil, converts into a first electromagnetic signal. This signal is sent to the stylus, which then returns a second electromagnetic signal to the screen coil. The screen coil converts this into a second current signal for the touch chip, which calculates the distance between the screen and stylus. This invention enables real-time distance monitoring and interaction between the screen and stylus with low cost and power consumption.

11 Claims, 8 Drawing Sheets

CAPACITIVE SCREENS AND METHODS FOR INTERACTION WITH A STYLUS

CROSS REFERENCE TO RELATED APPLICATIONS

This application is a continuation of International Application No. PCT/CN2023/071152, filed on Jan. 8, 2023, which claims priority to the Chinese patent application with application Ser. No. 202210720988.3, filed on Jun. 24, 2022, the disclosure of which is herein incorporated by reference in its entirety for all purposes.

TECHNICAL FIELD

The present application relates to the field of microelectronics, particularly to a capacitive screen, a method for interaction between the capacitive screen and a stylus, and a storage medium.

BACKGROUND

For most capacitive screens that support styluses, monitoring the distance between the capacitive screen and the stylus to timely initiate communication and interaction often requires high-voltage signal encoding on the capacitive screen, or even ultra-high voltage encoding. Another approach is to add an electromagnetic screen that sends signals to monitor the distance between the capacitive screen and the stylus. However, the hardware cost of an electromagnetic screen is relatively high, and high-voltage encoding has the following drawbacks: (1) High-voltage encoding increases power consumption; (2) High-voltage encoding requires special processes to support high-voltage output, leading to higher costs; (3) High-voltage encoding can interfere with the screen's display, making it difficult to accurately monitor the distance between the capacitive screen and the stylus.

SUMMARY

The purpose of the embodiments of the invention disclosed in this application is to provide a capacitive screen and a method for interaction between the capacitive screen and a stylus, which can monitor the distance between the capacitive screen and the stylus in real-time while ensuring low cost and low power consumption, thereby enabling timely initiation of communication and interaction between the capacitive screen and the stylus.

To solve the above technical problems, the embodiments of the invention disclosed in this application provide a capacitive screen, comprising: a touch control chip and a screen coil. The touch control chip is configured to generate a first current signal. The screen coil, integrated into the capacitive screen as a metal coil, is configured to generate a first electromagnetic signal based on the current signal and send the first electromagnetic signal to the stylus. Upon receiving the first electromagnetic signal, the stylus sends a second electromagnetic signal to the screen coil. The screen coil is further configured to receive the second electromagnetic signal and convert it into a second current signal, which is sent to the touch control chip. The touch control chip is also configured to determine the actual distance between the capacitive screen and the stylus based on the magnitude of the second current signal.

To solve the above technical problems, the embodiments of the invention disclosed in this application also provide a capacitive screen, comprising: a touch control chip and a screen coil. The touch control chip is configured to generate a third current signal. The screen coil, integrated into the capacitive screen as a metal coil, is configured to receive a third electromagnetic signal sent by the stylus and, upon receiving the third electromagnetic signal, generate a fourth electromagnetic signal based on the third current signal. The fourth electromagnetic signal is sent to the stylus, enabling the stylus to determine the actual distance between the capacitive screen and the stylus based on the fourth electromagnetic signal.

To solve the above technical problems, the embodiments of the invention disclosed in this application further provide a method for interaction between a capacitive screen and a stylus, comprising: generating a first electromagnetic signal based on a pre-obtained first current signal and transmitting the first electromagnetic signal to the stylus. Upon receiving the first electromagnetic signal, the stylus sends a second electromagnetic signal to the capacitive screen. The capacitive screen receives the second electromagnetic signal and converts it into a second current signal to determine the actual distance between the capacitive screen and the stylus based on the magnitude of the second current signal. The first electromagnetic signal is generated by a screen coil integrated into the capacitive screen.

To solve the above technical problems, the embodiments of the invention disclosed in this application further provide a method for interaction between a capacitive screen and a stylus, comprising: receiving a third electromagnetic signal sent by the stylus and, upon receiving the third electromagnetic signal, generating a fourth electromagnetic signal based on a pre-obtained third current signal. The fourth electromagnetic signal is sent to the stylus, enabling the stylus to determine the actual distance between the capacitive screen and the stylus based on the fourth electromagnetic signal. The fourth electromagnetic signal is generated by a screen coil integrated into the capacitive screen.

To solve the above technical problems, the embodiments of the invention disclosed in this application further provide a capacitive screen, comprising: at least one processor; and a memory communicatively connected to the at least one processor. The memory stores instructions executable by the at least one processor, enabling the at least one processor to perform the above-described method for interaction between the capacitive screen and the stylus.

To solve the above technical problems, the embodiments of the invention disclosed in this application further provide a computer-readable storage medium storing a computer program. When executed by a processor, the computer program implements the above-described method for interaction between the capacitive screen and the stylus.

Compared with the prior art, the capacitive screen in the present application includes: a touch control chip and a screen coil. The touch control chip is configured to generate a first current signal. The screen coil, integrated into the capacitive screen as a metal coil, is configured to generate a first electromagnetic signal based on the first current signal and send the first electromagnetic signal to the stylus. Upon receiving the first electromagnetic signal, the stylus sends a second electromagnetic signal to the screen coil. The screen coil is further configured to receive the second electromagnetic signal and convert it into a second current signal, which is sent to the touch control chip. The touch control chip is also configured to determine the actual distance between the capacitive screen and the stylus based on the magnitude of the second current signal. Since a screen coil is integrated into the capacitive screen in this application, the screen coil can generate electromagnetic induction based on the current signal generated by the touch control chip. The screen coil can thus generate the first electromagnetic signal with high sensitivity, allowing the stylus to receive the first electromagnetic signal even when the distance between the capacitive screen and the stylus is relatively long. This enables the stylus to send the second electromagnetic signal to the capacitive screen, which processes the second electromagnetic signal to determine the actual distance between the capacitive screen and the stylus. Therefore, this application does not require high-voltage encoding and can still monitor the distance between the capacitive screen and the stylus in real-time, enabling timely initiation of communication and interaction between the capacitive screen and the stylus. Additionally, since this application only integrates a simple screen coil into the existing capacitive screen, the cost of this application is relatively low.

Furthermore, one end of the screen coil is connected to the touch control chip to receive the current signal from the touch control chip, and the other end is connected to a reference potential (e.g., grounded). The screen coil in this application can generate an electromagnetic signal based on the current signal generated by the touch control chip.

Additionally, the screen coil is positioned around the periphery of the Transmission metal line and RX line, and the screen coil is not connected to the Transmission metal line and RX line. The screen coil in this application can transmit and receive signals through the TX and RX lines.

Furthermore, the screen coil is configured to periodically transmit the first electromagnetic signal and periodically receive the second electromagnetic signal. The screen coil in this application can periodically transmit and receive electromagnetic signals to achieve power-saving.

Moreover, the first electromagnetic signal is further configured to enable the stylus to determine the synchronization position of the first electromagnetic signal when the distance between the stylus and the capacitive screen is less than or equal to a first preset distance and greater than or equal to a second preset distance, to synchronize with the first electromagnetic signal sent by the screen coil. The first preset distance is the maximum distance at which the stylus can receive the first electromagnetic signal, and the second preset distance is less than the first preset distance. In this application, when the distance between the stylus and the capacitive screen is less than or equal to the first preset distance and greater than or equal to the second preset distance, the stylus synchronizes with the first electromagnetic signal sent by the screen coil to facilitate subsequent communication and interaction between the stylus and the capacitive screen.

Additionally, the capacitive screen further comprises: TX and RX lines; wherein the touch control chip is further configured to generate a first voltage signal to be sent to the stylus when the distance between the stylus and the capacitive screen is less than or equal to the second preset distance, enabling the stylus, upon receiving the first voltage signal, to send a second voltage signal to the capacitive screen. The first voltage signal is sent to the stylus through the Transmission metal line. The touch control chip is also configured to receive the second voltage signal through the RX line and determine the real-time coordinates of the stylus based on the magnitude of the second voltage signal. In this application, since the first voltage signal is sent to the stylus when the distance between the stylus and the capacitive screen is less than or equal to the second preset distance, the stylus can receive a relatively weak first voltage signal, and the capacitive screen can also receive the relatively weak second voltage signal sent by the stylus to determine the real-time coordinates of the stylus based on the second voltage signal.

BRIEF DESCRIPTION OF THE DRAWINGS

The accompanying figures (Figs.) illustrate embodiments and explain principles of the disclosed embodiments. It is to be understood, however, that these figures are presented for purposes of illustration only, and not for defining limits of relevant applications.

DETAILED DESCRIPTION OF THE INVENTION

To make the objectives, technical solutions, and advantages of this application clearer, the various embodiments of this application will be described in detail below with reference to the accompanying drawings. However, it is understood by those skilled in the art that numerous technical details have been provided in the embodiments to help readers better understand the application. Nevertheless, the technical solutions claimed in this application can still be realized without these technical details and based on various changes and modifications to the following embodiments. The division of the following embodiments is for convenience of description and should not be construed to limit the scope of the invention disclosed in this application. Each embodiment can be combined and referenced with each other if there is no contradiction.

To monitor the distance between a capacitive screen and a stylus and to timely initiate communication and interaction between them, one approach involves high-voltage encoding on the capacitive screen. Specifically, as shown in the schematic diagram in FIG. 1, the capacitive screen sends a voltage signal to the stylus through capacitive coupling. While the capacitive screen and stylus interact through capacitive effects, this coupling is highly sensitive to spatial distance, often requiring the stylus to be very close to the screen to be recognized. Although encoding with higher-than-normal voltage can enhance the signal strength, it also increases power consumption and requires support of process dealing with higher voltage required by the conventional approaches, which are costly.

Figure 2:
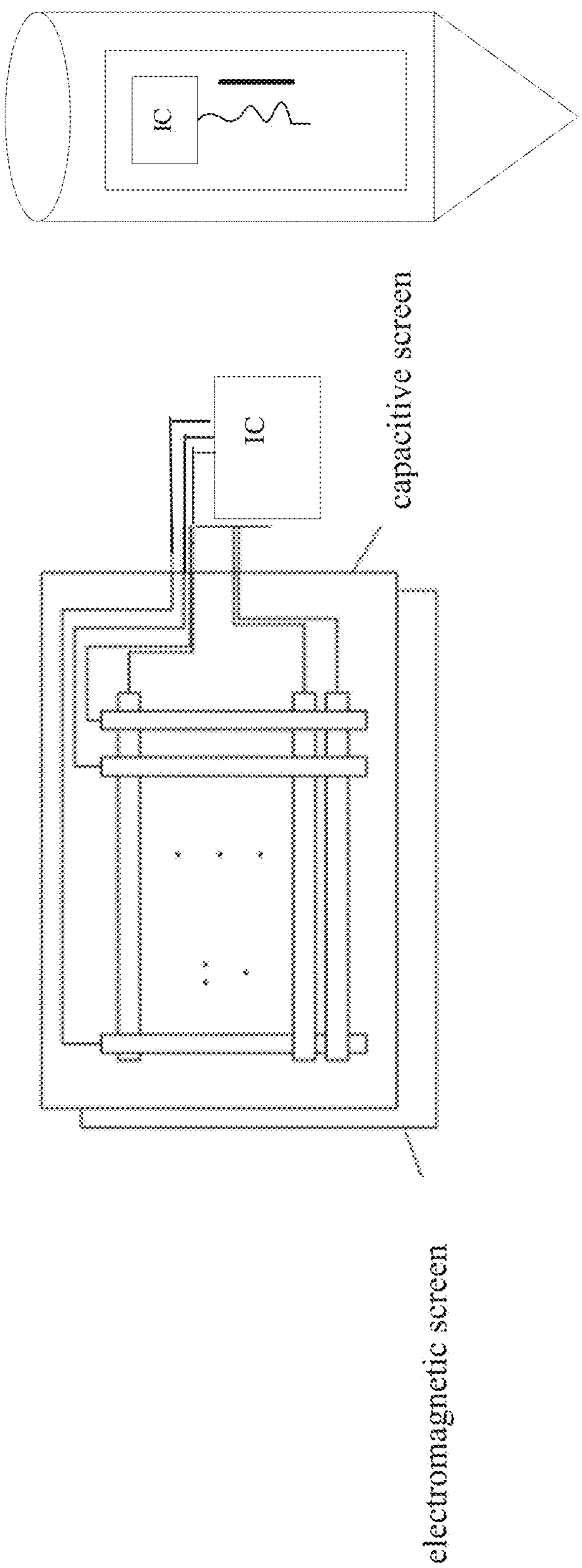
FIG. 2 is a schematic diagram of the structure of a capacitive screen and a stylus (second view) according to some embodiments of this application.

Another known approach combines an electromagnetic screen with the capacitive screen, as shown in the schematic diagram in FIG. 2, to achieve distance sensing and coordinate positioning between the capacitive screen and the stylus through electromagnetic effects. However, in this approach, the electromagnetic screen and the capacitive screen are separate layers, with the electromagnetic screen being relatively expensive in terms of hardware cost.

Figure 3:
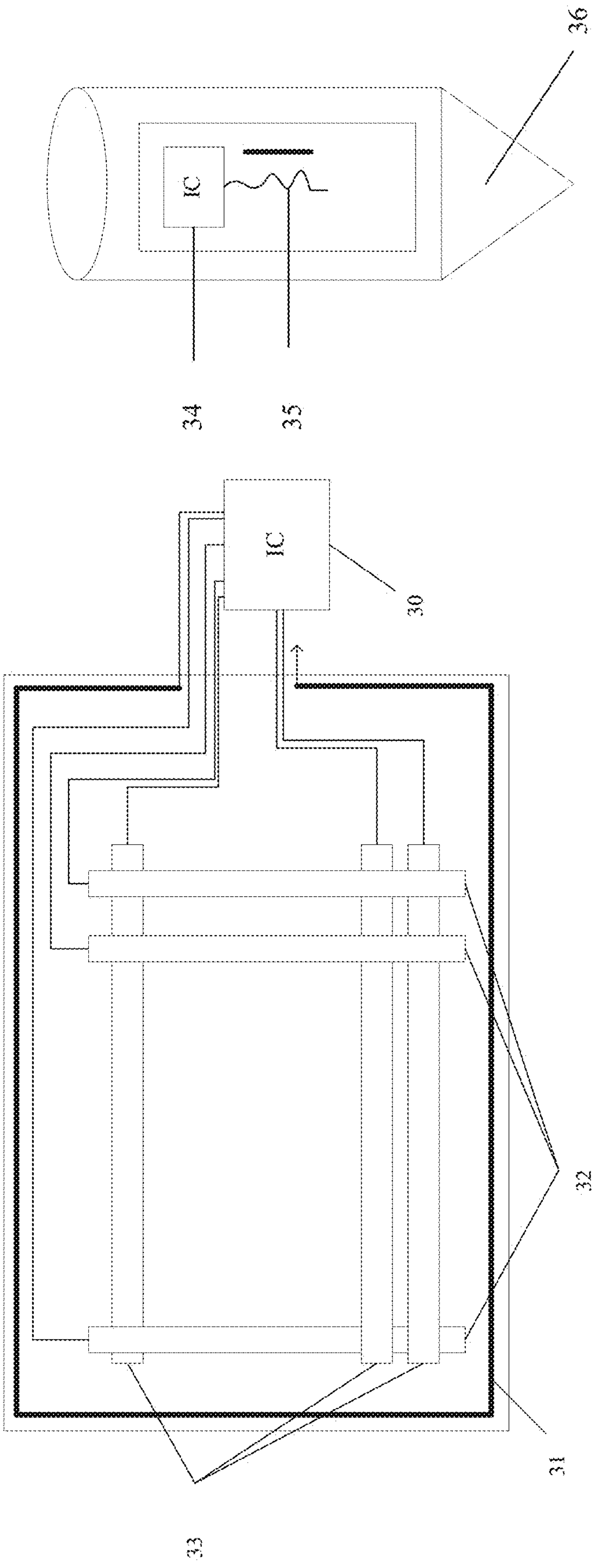
FIG. 3 is a schematic diagram of the structure of a capacitive screen and a stylus according to one embodiment of the invention disclosed in this application.

To address these issues, the capacitive screen disclosed in this invention can monitor the distance between itself and the stylus in real-time, ensuring low cost and low power consumption. This enables timely communication and interaction between the capacitive screen and the stylus. FIG. 3 is a schematic diagram of the structure of a capacitive screen and a stylus according to one embodiment of the invention disclosed in this application. The implementation details of the capacitive screen in this embodiment are specifically described below for convenience of understanding and should not be construed to limit the invention. The structure of the capacitive screen in FIG. 3 includes: a touch control chip (30), a screen coil (31), a transmission metal line (TX line 32), and a reception metal line (RX line 33).

Figure 4:
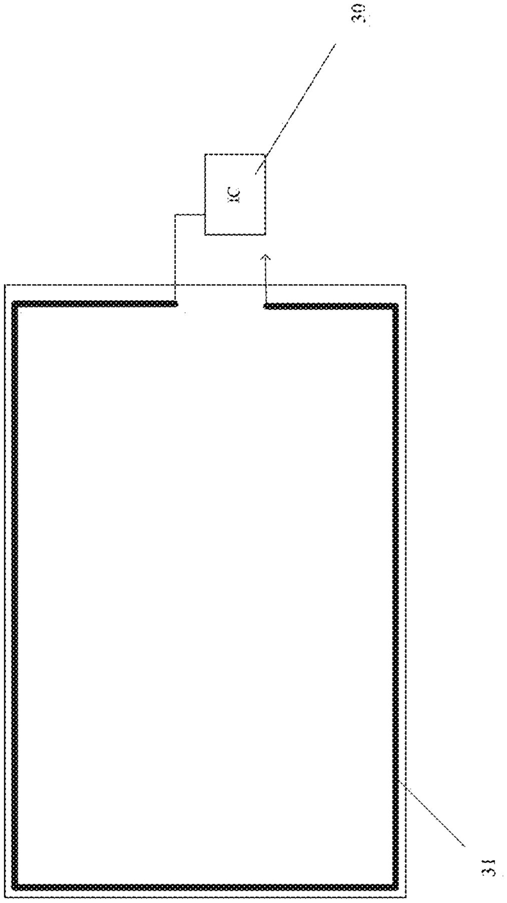
FIG. 4 is a schematic diagram of the structure of a screen coil according to one embodiment of the invention disclosed in this application.

The structure of the screen coil 31 is illustrated more clearly in FIG. 4. The screen coil 31 is a metal coil integrated into the capacitive screen. One end of the screen coil 31 is connected to a pin on the touch control chip 30 to receive a current signal, while the other end is connected to a reference potential. (e.g., grounded). The screen coil 31 is positioned around the periphery of the capacitive screen, enclosing the TX line 32 and RX line 33. Importantly, the screen coil 31 is not directly connected to the TX line 32 or RX line 33, allowing these lines to transmit and receive signals independently. The TX line 32 and RX line 33 are specifically arranged as vertical and horizontal metal lines on the capacitive screen.

As depicted in FIG. 4, the touch control chip 30 is designed to generate a first current signal (I1) and transmit it to the screen coil 31. The generation of this current signal can be adjusted by a person of skill in the art to meet specific requirements.

Figure 1:
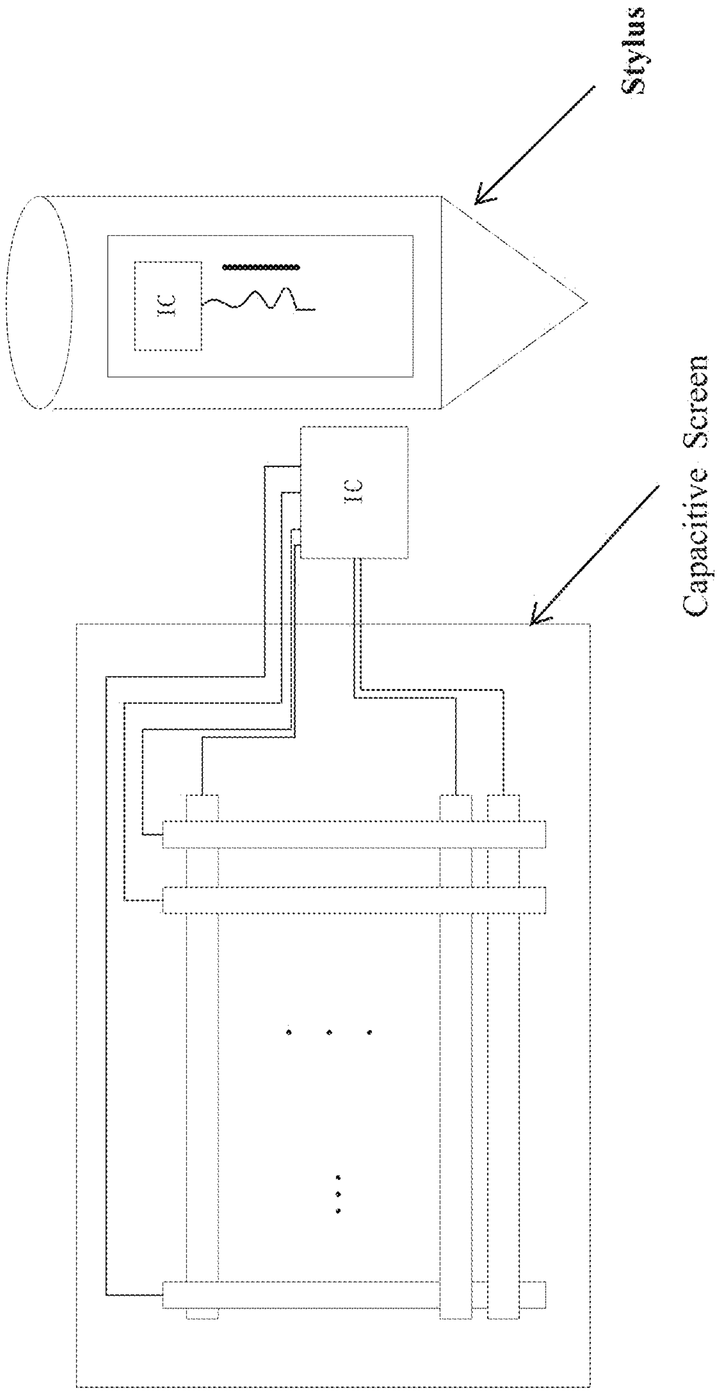
FIG. 1 is a schematic diagram of the structure of a capacitive screen and a stylus (first view) according to some embodiments of this application.

The screen coil 31 plays a crucial role in enabling communication between the capacitive screen and the stylus. Initially, the touch control chip 30 sends the first current signal (I1) to the screen coil 31. The screen coil 31 then converts this current signal into a first electromagnetic signal, which is transmitted to the stylus (as illustrated in FIGS. 1-3). Upon receiving this electromagnetic signal, the stylus responds by sending a second electromagnetic signal back to the screen coil 31.

When the screen coil 31 receives the second electromagnetic signal, it uses the principle of electromagnetic induction to convert the received signal into a second current signal (I2). This conversion occurs as the changing magnetic field of the incoming signal induces a voltage across the coil, thereby generating the second current signal. The screen coil 31 then transmits this second current signal (I2) to the touch control chip 30.

The touch control chip 30 analyzes the second current signal (I2) to determine the distance between the stylus and the capacitive screen. The magnitude of the second current signal provides the necessary data for this calculation. Additionally, the design of the screen coil 31, including its size and number of turns, can be customized to accommodate specific design requirements without compromising functionality.

This process ensures that the touch control chip can accurately track the stylus's position, enabling precise interaction with the capacitive screen.

FIG. 3 also illustrates the structure of a stylus according to one embodiment of the invention disclosed in this application, which includes an internal chip 34, an internal stylus coil 35, and a TX/RX module 36. In this design, the stylus receives the first electromagnetic signal sent by the screen coil 31 through the TX/RX module 36. Upon receiving the first electromagnetic signal, the internal chip 34 generates a drive current for the internal stylus coil 35, which in turn produces a second electromagnetic signal that is sent back to the screen coil 31. The screen coil 31 then converts the second electromagnetic signal into the second current signal (I2) and sends this signal to the touch control chip 30. The touch control chip 30 uses the magnitude of the second current signal (I2) to determine the distance between the capacitive screen and the stylus. The size and number of turns of the internal stylus coil 35 can also be configured by skilled professionals according to specific needs. The method for calculating the exact distance between the capacitive screen and the stylus through signal processing is known in the art and not detailed here for brevity.

In a specific implementation, the screen coil 31 is assumed to be a single-sided straight conductor. The magnetic field intensity around the screen coil 31 can be described by the equation $B=\mu_0*I/2\pi r$, where the touch control chip 30 applies a current signal with frequency ω, and the current signal I is an alternating current given by $I=I_0*\cos(\omega t)$. The area of the stylus coil 35 is denoted as A, so the magnetic flux φ through the stylus coil 35 is B*A.

The induced electromotive force generated in the stylus coil 35 is given by:

$$\varepsilon=-\frac{d\varphi}{dt}=\frac{n*\mu_0*I_0*A*\omega*\sin(\omega t)}{2\pi r}$$

Where:

$\mu_0$ is the vacuum permeability, with a value of $4\pi*10^{-7}$ H/m,

A is the area of the single-turn stylus coil, measured in square meters ($m^2$), B is the magnetic induction strength, measured in teslas T, $I_0$ is the amplitude of the current generated by the touch control chip 30, measured in amperes A;

ω is the frequency of the current signal, measured in radians per second rad/s, r is the distance between the capacitive screen and the stylus, measured in meters m, n is the number of turns in the stylus coil, t is time, measured in seconds s, ε is the induced electromotive force, measured in volts V.

Therefore, the value of the induced electromotive force generated on the stylus coil 35 is inversely proportional to the distance r between the capacitive screen and the stylus.

Consider a scenario where the passive end coil in a stylus has a single turn (i.e., n=1). The diameter of this single-turn pen coil is 0.004 meters, which gives it an area (A) of $2.5\times10^{-5}$ square meters. The current signal generated by the touch control chip has an amplitude ($I_0$) of 0.01 amperes. The stylus is held at a distance of 0.03 meters from the capacitive screen, and the frequency of the current signal (ω) is 2π×250 kHz.

Using these values and the formula provided earlier, the induced electromotive force (ε) is calculated to be $2.6\times10^{-6}$ volts, or 2.6 microvolts. This means that when the stylus is 0.03 meters away from the screen, it generates a small voltage of 2.6 microvolts.

Now, to improve the stylus's performance, we can do so in a couple of ways: one is to increase the current signal. By increasing the current generated by the touch control chip, we can enhance the magnetic induction strength (B). This stronger magnetic field would allow the stylus to receive the electromagnetic signal even when it is further away from the capacitive screen. Another way is to increase the number of coil turns. By increasing the number of turns in the pen coil, the induced electromotive force (ϵ) will also increase. This would strengthen the second electromagnetic signal, enabling the capacitive screen to detect signals from the stylus at a greater distance. These improvements, combined with careful front-end circuit design, ensure that the interaction between the capacitive screen and the stylus is efficient and reliable, even when there is some distance between them.

To establish a connection between the capacitive screen and the stylus, and to calculate the precise coordinates of the stylus on the screen, there are a few important steps involved.

First, the stylus must detect the signal sent by the capacitive screen. For this to happen, the stylus needs to be within a certain distance from the screen-close enough to receive the initial electromagnetic signal. This is the first crucial step in the process.

Next, the stylus needs to synchronize with the signal from the capacitive screen. This synchronization process occurs after the stylus detects the second electromagnetic signal, which is generated within the pen coil (part of the stylus). By analyzing this second signal, the actual distance between the stylus and the screen can be determined. With this distance known, the stylus can then synchronize itself with the screen's signal. Specifically, the stylus identifies a key point in the first electromagnetic signal-known as the "synchronization head position"—which allows it to lock onto the signal and maintain synchronization.

In this implementation, the first electromagnetic signal plays a critical role in enabling the stylus to find the synchronization head position. This occurs when the stylus is within a certain range of distances from the screen. The maximum distance at which the stylus can still receive this signal is known as the "first preset distance." If the stylus is closer to the screen than this maximum distance but farther than a "second preset distance" (a slightly closer range), it can still receive the signal and determine the synchronization head position.

Since the stylus is constantly moving, either towards or away from the screen, its position is continually changing. However, as long as the stylus remains within the range between the first and second preset distances, it will continue to receive the first electromagnetic signal from the screen's coil. This ongoing communication allows the stylus to accurately determine its position relative to the screen and maintain synchronization with the signal sent by the screen.

Figure 5:
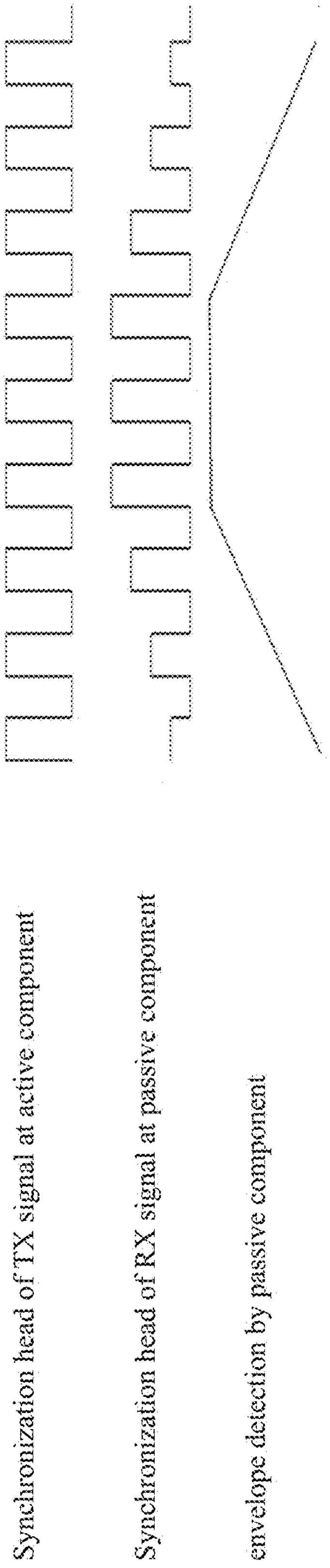
FIG. 5 is a schematic diagram of a synchronization signal method according to one embodiment of the invention disclosed in this application (first view).

One approach to determine the position of the synchronization head of the electromagnetic signal involves performing envelope detection on the signal, as illustrated in FIG. 5. In this scenario, the capacitive screen acts as the active component, while the stylus serves as the passive component. Since the detected synchronization head rises from zero and then falls back to zero, detecting the starting point of the envelope and applying an appropriate delay allows for the accurate determination of the synchronization head position.

Figure 6:
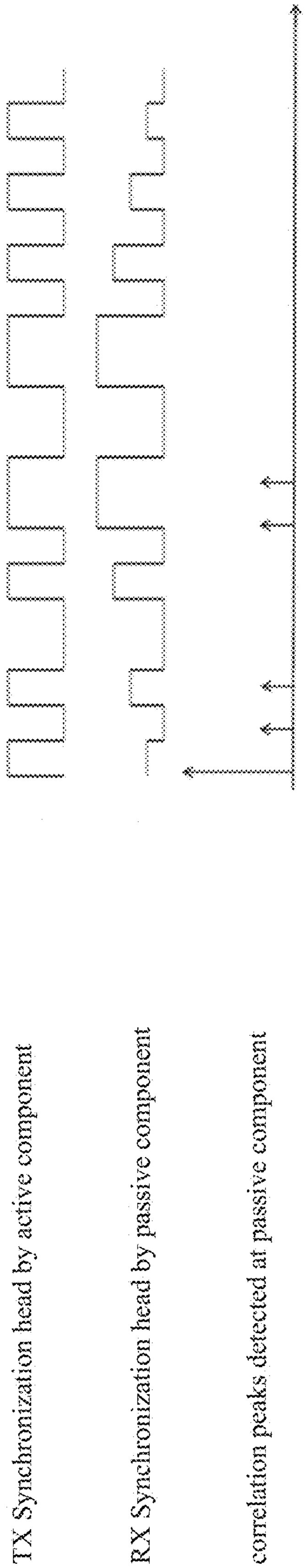
FIG. 6 is a schematic diagram of a synchronization signal method according to one embodiment of the invention disclosed in this application (second view).

Another approach is to determine the synchronization head position based on its encoding characteristics, as shown in FIG. 6. Here again, the capacitive screen is the active component, and the stylus is the passive one. The synchronization head may be encoded with specific characteristics, such as high autocorrelation energy and low cross-correlation energy. By identifying the matching peak using these encoding characteristics, the synchronization head position can be determined, allowing the stylus to synchronize with the first electromagnetic signal emitted by the screen coil 31.

In some implementations, once the stylus reaches a distance where it can receive the initial electromagnetic signal and has synchronized with the signal sent by the capacitive screen, its real-time coordinates can be determined through the following process: the touch control chip 30 generates a first voltage signal when the stylus is within a specific range, known as the second preset distance, from the capacitive screen. This signal is sent to the stylus via the TX line 32.

Upon receiving this signal, the stylus responds by sending a second voltage signal back to the capacitive screen. This second voltage signal is transmitted through the RX line 33 and is used by the touch control chip to determine the stylus's real-time coordinates based on the strength of the signal.

Since the stylus is within the second preset distance, it is already very close to the screen. At this proximity, both the first voltage signal from the touch control chip and the second voltage signal from the stylus are relatively weak. However, the capacitive screen can still detect these weak signals and accurately determine the stylus's position.

By setting both the first and second preset distances, the system dynamically adjusts the gain of the capacitive screen's processing chain. This adjustment allows the capacitive screen and stylus to detect and process weaker signals effectively, enabling accurate real-time tracking of the stylus even when it is very close to the screen.

In other implementations, the screen coil 31 periodically alternates between sending a first electromagnetic signal and receiving a second electromagnetic signal. In other words, the capacitive screen does not need to continuously send or receive electromagnetic signals, but instead can switch between these modes periodically, which helps to conserve power.

Figure 7:
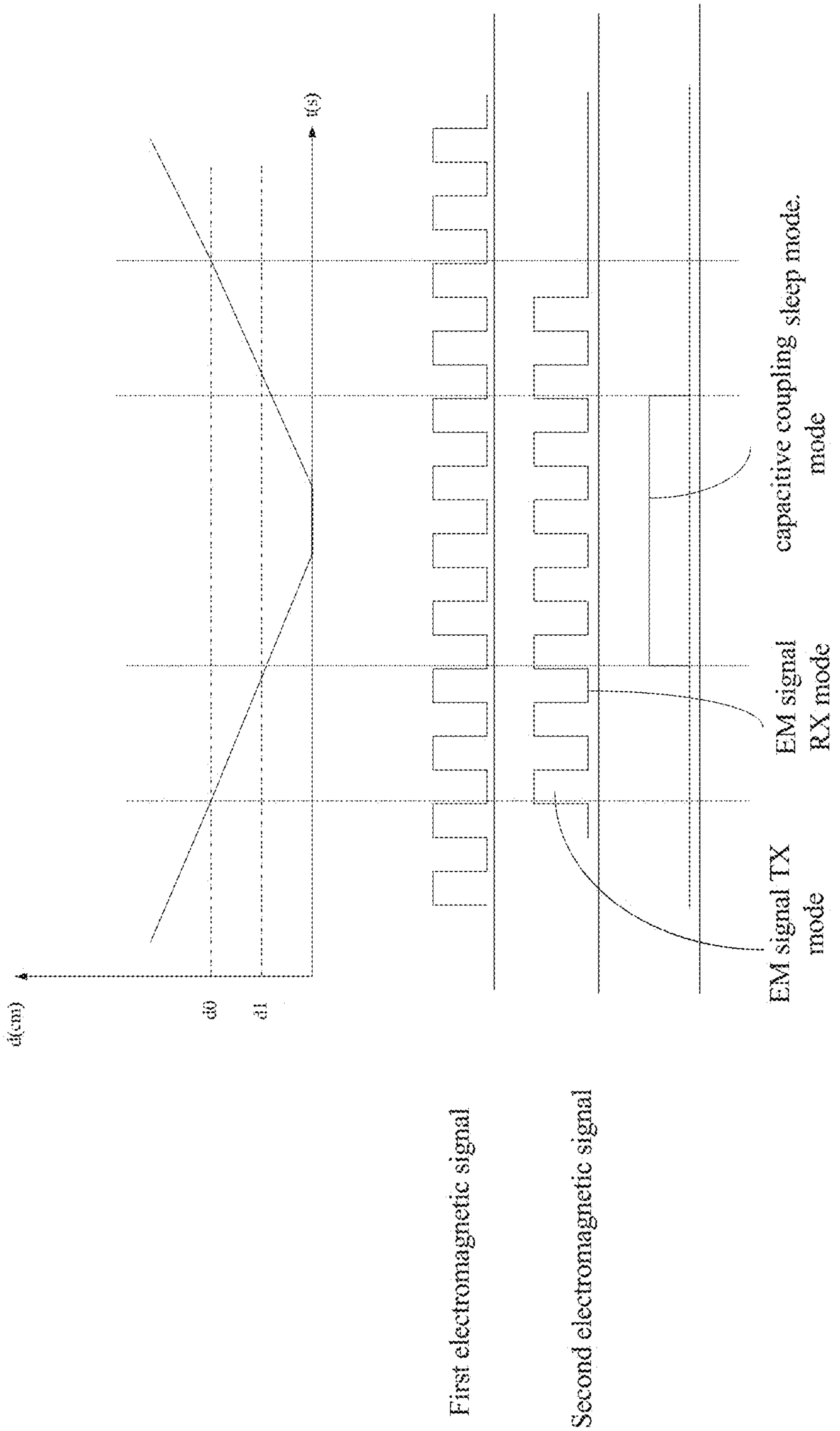
FIG. 7 is a schematic diagram of the working mode of a capacitive screen according to one embodiment of the invention disclosed in this application.

Specifically, as illustrated in FIG. 7, the capacitive screen operates in two distinct modes: the electromagnetic signal (EM) transmitting mode and the electromagnetic signal (EM) receiving mode.

In the EM sending mode, the screen coil 31 transmits the first electromagnetic signal. The stylus, which is typically in the EM receiving mode, picks up this signal. Alternatively, the stylus may enter the EM receiving mode from a low-power sleep state. If the distance between the capacitive screen and the stylus is less than or equal to a predetermined distance do, the stylus can receive the first electromagnetic signal and becomes activated.

Once activated, the stylus begins to periodically alternate between EM sending and EM receiving modes. In the EM sending mode, the stylus transmits a second electromagnetic signal back to the capacitive screen. The screen coil 31 receives this signal in its EM receiving mode. The system then calculates the actual distance between the screen and the stylus based on these signals, enabling synchronized operation between the two devices.

When the distance between the capacitive screen and the stylus is less than or equal to a second preset distance $d_1$, the system enters a capacitive coupling mode. In this mode, the touch control chip 30 sends a first voltage signal to the stylus, prompting it to enter the capacitive coupling mode as well. The stylus then sends a second voltage signal back to the screen coil 31. The screen coil determines the real-time coordinates of the stylus based on the transmission time of the received signal.

When the distance between the capacitive screen and the stylus exceeds the second preset distance $d_1$, the system exits the capacitive coupling mode and enters a low-power capacitive coupling sleep mode. In this state, the touch control chip 30 generates a current signal, prompting the screen coil 31 to send the first electromagnetic signal to the stylus.

The system continues to monitor the distance between the screen and the stylus using electromagnetic induction. If the distance between the screen and the stylus exceeds the first preset distance do, the stylus exits the EM sending mode and either enters a low-power EM receiving mode or a sleep state. When the distance exceeds $d_1$, the system completely exits the capacitive coupling mode.

It should be understood that, when both the capacitive screen and the stylus are in the capacitive coupling mode and have determined the stylus's real-time coordinates, they can also exchange command information via electromagnetic signals. For instance, after the capacitive screen sends the first electromagnetic signal through the screen coil 31, the stylus responds by sending the second electromagnetic signal back to the screen coil. This allows for interaction between the screen and the stylus, such as activating or deactivating the capacitive coupling mode, putting the system into a sleep mode, or transmitting pressure-sensing data from the stylus to the screen.

It should be noted that the examples provided above are for illustrative purposes to aid understanding and should not be construed to limit the scope of the invention disclosed in this application.

In the above discussion, the capacitive screen includes a touch control chip and a screen coil. The touch control chip is responsible for generating a first current signal. The screen coil, which is integrated into the capacitive screen as a metal coil, uses this current signal to generate a first electromagnetic signal. This first electromagnetic signal is then sent to the stylus. Upon receiving the first electromagnetic signal, the stylus responds by sending a second electromagnetic signal back to the screen coil. The screen coil then receives this second electromagnetic signal and converts it into a second current signal, which is sent to the touch control chip. The touch control chip uses the magnitude of this second current signal to determine the actual distance between the capacitive screen and the stylus.

The integration of the screen coil into the capacitive screen enables the generation of electromagnetic induction based on the current signal from the touch control chip, which in turn produces the first electromagnetic signal. Thanks to the high sensitivity of electromagnetic induction, the capacitive screen can send this first electromagnetic signal to the stylus even when the stylus is relatively far away. The stylus can still receive the signal and send the second electromagnetic signal back to the capacitive screen, allowing the system to process this signal and accurately determine the distance between the screen and the stylus.

As a result, this approach eliminates the need for high-voltage signal encoding while still allowing the capacitive screen to monitor the distance between itself and the stylus in real time. This capability facilitates timely communication and interaction between the screen and the stylus.

Additionally, because this solution only requires the integration of a simple screen coil into the existing capacitive screen, the overall cost remains relatively low.

Next, we discuss another embodiment of the capacitive screen described in this disclosure. The structure of the capacitive screen in this embodiment is illustrated in FIG. 3 and includes a touch control chip 30, a screen coil 31, a TX line 32, and an RX line 33. The specific structure of the capacitive screen is the same as described in the capacitive screen embodiment discussed above, so it will not be elaborated on here.

The key difference between this embodiment and the capacitive screen embodiment discussed above is the role of the capacitive screen and the stylus in the signal exchange. In the capacitive screen embodiment discussed above, the capacitive screen initiates communication by sending a first electromagnetic signal to the stylus. Upon receiving this signal, the stylus sends a second electromagnetic signal back to the capacitive screen, which then determines the distance, making the capacitive screen the active component.

In contrast, in this embodiment, the stylus takes the active role. It sends a third electromagnetic signal to the capacitive screen. After receiving this signal, the capacitive screen responds by sending a fourth electromagnetic signal back to the stylus. The stylus then uses this signal to determine the distance between itself and the capacitive screen.

The following details explain the implementation of this capacitive screen in greater detail. These specifics are provided to aid understanding and should not be construed to limit the scope of the invention disclosed in this application.

In this second embodiment, the touch control chip 30 generates a third current signal. The screen coil 31, integrated into the capacitive screen as a metal coil, is designed to receive the third electromagnetic signal sent by the stylus. Upon receiving this signal, the screen coil generates a fourth electromagnetic signal based on the current signal produced by the touch control chip 30. This fourth electromagnetic signal is then sent to the stylus, allowing the stylus to calculate the actual distance between itself and the capacitive screen.

The structure of the stylus in this second embodiment is the same as in the first capacitive screen embodiment discussed above. It includes a stylus chip 34, a stylus coil 35, and a TX/RX module 36.

In some specific implementations, the stylus chip 34 generates a drive current, which is used by the stylus coil 35 to produce a third electromagnetic signal. This third electromagnetic signal is then sent to the screen coil 31. Upon receiving the third electromagnetic signal, the screen coil 31 generates a fourth electromagnetic signal based on a third current signal produced by the touch control chip 30. This fourth electromagnetic signal is then transmitted back to the stylus. When the stylus coil 35 receives the fourth electromagnetic signal, it converts it into a fourth current signal and sends this signal to the stylus chip 34. The stylus chip 34 then determines the actual distance between the capacitive screen and the stylus by analyzing the magnitude of the fourth current signal.

Therefore, by increasing the drive current of the stylus chip 34, increasing the number of turns in the stylus coil 35, or using a core in the stylus coil 35 to enhance magnetic permeability ($\mu$), the magnetic induction intensity (B) generated by the stylus can be significantly increased, thereby enhancing the third electromagnetic signal. This allows the capacitive screen to receive the third electromagnetic signal sent by the stylus using only a single-turn screen coil 31.

It should be noted that the only difference between this second embodiment and the first embodiment is that in this second embodiment, the stylus takes an active role, calculating the actual distance between the capacitive screen and the stylus. The specific implementation details are generally the same as in the first embodiment, and the related technical details mentioned in the first embodiment can also be applied in this embodiment.

As discussed above, either the capacitive screen or the stylus can function as the active component in determining the distance between them. Professionals in the field can choose the most suitable approach based on specific requirements.

Another embodiment of the present disclosure involves a method for enabling interaction between a capacitive screen and a stylus. This method is applied specifically to a capacitive screen, with the implementation details described below. The following explanation is provided to aid understanding and should not be construed to limit the scope of the invention disclosed in this application.

Figure 8:
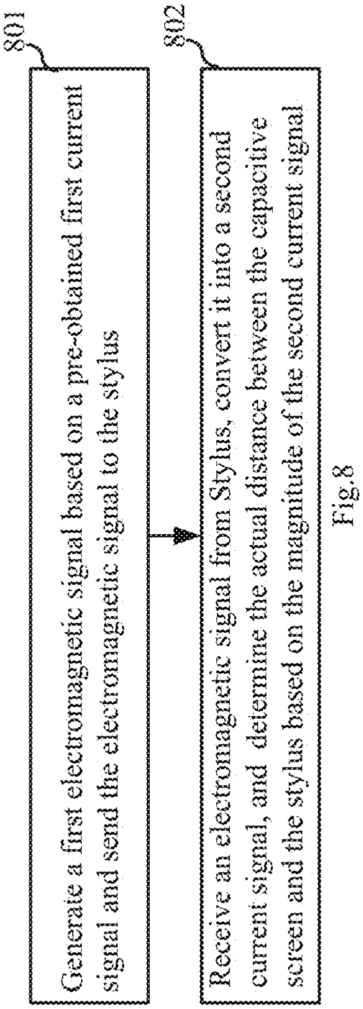
FIG. 8 is a flowchart of an interaction method between a capacitive screen and a stylus according to one embodiment of the invention disclosed in this application (first view).

The specific process of interaction between the capacitive screen and the stylus in this first method embodiment is illustrated in FIG. 8 and includes the following steps:

Step 801: Generate a first electromagnetic signal based on a pre-obtained first current signal and send this signal to the stylus. After receiving the first electromagnetic signal, the stylus responds by sending a second electromagnetic signal back to the capacitive screen. The first electromagnetic signal is generated by a screen coil integrated into the capacitive screen.

Step 802: Receive the second electromagnetic signal and convert it into a second current signal. Use the magnitude of this second current signal to determine the actual distance between the capacitive screen and the stylus.

In this embodiment, the first electromagnetic signal is generated by the screen coil, which is highly sensitive to the presence and distance of the stylus. This sensitivity allows the capacitive screen to send a detectable electromagnetic signal to the stylus, even when the stylus is relatively far away.

Because the system is designed to be responsive to small changes in the electromagnetic field, the stylus can still detect the first electromagnetic signal from a considerable distance. After detecting the signal, the stylus responds by sending a second electromagnetic signal back to the screen.

The capacitive screen then processes this second electromagnetic signal to accurately determine the distance between itself and the stylus. As a result, this system does not require the stronger signal power typically needed in conventional approaches to achieve long-range detection. Instead, it can monitor the distance between the capacitive screen and the stylus in real time, enabling timely communication and interaction between the two devices.

Additionally, because this approach only requires the integration of a simple screen coil into the existing capacitive screen, the overall cost of implementation remains relatively low.

It should be appreciated by those skilled in the art that the embodiment discussed above corresponds to a method embodiment of the first device embodiment of the capacitive screen described in this disclosure. This method embodiment can be implemented in conjunction with the first device embodiment of the capacitive screen. The relevant technical details discussed in the first device embodiment remain applicable in this method embodiment, and to avoid repetition, they are not detailed here. Conversely, the technical details described in this method embodiment can also be applied to the first device embodiment.

Figure 9:
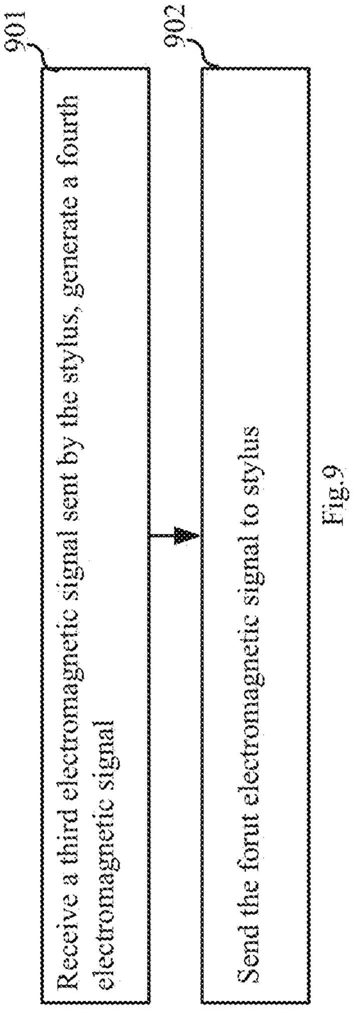
FIG. 9 is a flowchart of an interaction method between a capacitive screen and a stylus according to one embodiment of the invention disclosed in this application (second view).

Another embodiment of the invention disclosed in this application relates to a method for interaction between a capacitive screen and a stylus, applied to a capacitive screen. The implementation details of the capacitive screen in this embodiment are specifically described below. The following details are provided only to facilitate understanding and should not be construed to limit the scope of this invention. The specific process of the interaction between the capacitive screen and the stylus in this embodiment is shown in FIG. 9, and includes the following steps:

Step 901: Receive a third electromagnetic signal sent by the stylus, and after receiving the third electromagnetic signal, generate a fourth electromagnetic signal based on a pre-obtained third current signal. The fourth electromagnetic signal is generated by a screen coil integrated into the capacitive screen.

Step 902: Send the fourth electromagnetic signal to the stylus, allowing the stylus to determine the actual distance between the capacitive screen and the stylus based on the fourth electromagnetic signal.

In this embodiment, after the capacitive screen receives the third electromagnetic signal from the stylus, it generates the fourth electromagnetic signal through the screen coil. Due to the high sensitivity of electromagnetic induction, the capacitive screen can effectively send the fourth electromagnetic signal to the stylus. Even when the distance between the capacitive screen and the stylus is relatively long, the stylus can still receive the fourth electromagnetic signal, enabling it to determine the actual distance between the capacitive screen and the stylus based on this signal.

As a result, this approach does not require the stronger signal power typically needed in conventional methods for long-range detection. Instead, it allows for real-time monitoring of the distance between the capacitive screen and the stylus, facilitating timely communication and interaction between the two devices. Additionally, since this approach only involves the integration of a simple screen coil into the existing capacitive screen, the overall cost of implementation remains relatively low.

It should be appreciated by a person skilled in the art that this method embodiment corresponds to the second capacitive screen embodiment.

The relevant technical details mentioned in the second device embodiment are still valid in this second method embodiment, and to avoid repetition, they are not detailed here. Accordingly, the relevant technical details mentioned in this second method embodiment can also be applied in the second device embodiment.

The division of steps in the various methods described above is solely for clarity. During implementation, steps can be combined into one or certain steps can be split into multiple steps. As long as the same logical relationship is maintained, such variations fall within the protection scope of this patent. Additionally, any minor modifications or the introduction of insignificant designs to the algorithm or process that do not alter the core design of the algorithm and process are also within the protection scope of this patent.

Figure 10:
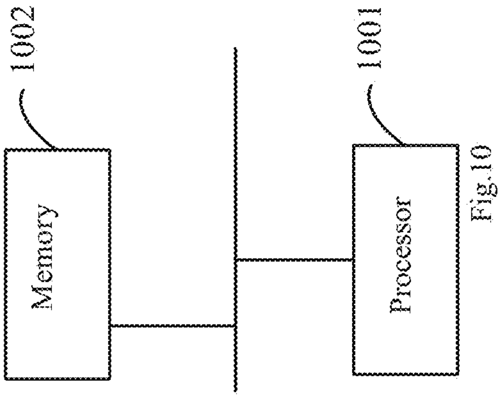
FIG. 10 is a schematic diagram of the structure of a capacitive screen according to another embodiment of the invention disclosed in this application.

Another embodiment of the invention disclosed in this application relates to a capacitive screen, as shown in FIG. 10, which includes: at least one processor 1001; and a memory 1002 communicatively connected to the at least one processor 1001. The memory 1002 stores instructions executable by the at least one processor 1001, enabling the at least one processor 1001 to perform the interaction method between the capacitive screen and the stylus as described in the above embodiments.

In this embodiment, the memory and processor are connected via a bus, which may include any number of interconnected buses and bridges. The bus connects various circuits of one or more processors and memories together. The bus may also connect various other circuits such as peripherals, regulators, and power management circuits, all of which are well-known in the field, so further description is omitted. A bus interface provides the connection between the bus and the transceiver. The transceiver may consist of one or multiple components, such as multiple receivers and transmitters, which provide the means to communicate with various other devices over a transmission medium. Data processed by the processor is transmitted over a wireless medium through an antenna. Additionally, the antenna receives data and transmits it to the processor.

The processor is responsible for managing the bus and general processing tasks, and it can also provide various functions, including timing, peripheral interfaces, voltage regulation, power management, and other control functions. The memory can be used to store data that the processor uses while performing operations.

Another embodiment of the invention disclosed in this application relates to a computer-readable storage medium storing a computer program. When executed by a processor, the computer program implements the aforementioned method embodiments.

That is to say, those skilled in the art can understand that all or part of the steps in the above-described method embodiments can be accomplished by a program instructing related hardware. This program is stored in a storage medium and includes several instructions for causing a device (which can be a microcontroller, chip, etc.) or processor to execute all or part of the steps of the methods described in the various embodiments of this application. The aforementioned storage medium includes various media that can store program code, such as USB drives, portable hard drives, read-only memory (ROM), random access memory (RAM), magnetic disks, or optical discs.

One of ordinary skill in the art will understand that the above embodiments are specific implementations of the invention disclosed in this application. In practical application, various changes can be made in form and detail without departing from the spirit and scope of the invention.

What is claimed is:

1. A capacitive screen, comprising:

a touch control chip configured to generate a first current signal; and a screen coil operable to:

generate a first electromagnetic signal based on the first current signal, transmit the first electromagnetic signal to a stylus, receive a second electromagnetic signal transmitted by the stylus, and convert the second electromagnetic signal into a second current signal;

wherein the touch control chip is further configured to determine a quantitative distance between the capacitive screen and the stylus based on a magnitude or waveform characteristic of the second current signal.

2. The capacitive screen of claim 1, wherein the screen coil has a first end connected to the touch control chip to receive the first current signal and a second end connected to a reference potential.

3. The capacitive screen of claim 2, wherein the screen coil is configured to periodically transmit the first electromagnetic signal and periodically receive the second electromagnetic signal.

4. The capacitive screen of claim 2, further comprising a transmission metal line and a reception metal line, wherein the screen coil is positioned around the transmission metal line and the reception metal line, such that the screen coil is located at a periphery surrounding both the transmission metal line and the reception metal line, and wherein the screen coil is not connected to the transmission metal line and the reception metal line.

5. The capacitive screen of claim 1, wherein the first electromagnetic signal is configured to enable synchronization between the stylus and the capacitive screen when the stylus is positioned within a preset distance range relative to the capacitive screen.

6. The capacitive screen of claim 5, wherein the preset distance range is between a first preset distance at which the stylus can receive the first electromagnetic signal and a second preset distance less than the first preset distance.

7. The capacitive screen of claim 5, further comprising:

a transmission metal line;

a reception metal line;

wherein the touch control chip is configured to:

generate a first voltage signal and transmit the first voltage signal to the stylus through the transmission metal line when the distance between the stylus and the capacitive screen is less than or equal to a second preset distance;

receive a second voltage signal from the stylus through the reception metal line; and determine real-time coordinates of the stylus based on magnitude of the second voltage signal.

8. A capacitive screen, comprising:

a touch control chip configured to generate a current signal;

a screen coil integrated into the capacitive screen, wherein the screen coil is configured to:

receive an electromagnetic signal from a stylus, generate a second electromagnetic signal based on the current signal, and transmit the second electromagnetic signal to the stylus.

9. A method for operating a capacitive screen and a stylus, comprising:

generating, by a screen coil integrated into the capacitive screen, a first electromagnetic signal based on a first current signal;

transmitting the first electromagnetic signal to the stylus;

receiving, by the screen coil, a second electromagnetic signal from the stylus in response to the first electromagnetic signal;

converting the second electromagnetic signal into a second current signal; and determining a quantitative distance between the capacitive screen and the stylus based on a magnitude or waveform of the second current signal.

10. A method for operating a capacitive screen and a stylus, comprising:

receiving a third electromagnetic signal sent by the stylus and, upon receiving the third electromagnetic signal, generating a fourth electromagnetic signal based on a pre-obtained third current signal;

sending the fourth electromagnetic signal to the stylus, enabling the stylus to determine actual distance between the capacitive screen and the stylus based on the fourth electromagnetic signal;

wherein the fourth electromagnetic signal is generated by a screen coil integrated into the capacitive screen.

11. A capacitive screen, comprising:

at least one processor; and a memory communicatively connected to the at least one processor;

wherein the memory stores instructions executable by the at least one processor to enable the at least one processor to perform the following:

generating, by a screen coil integrated into the capacitive screen, a first electromagnetic signal based on a first current signal;

transmitting the first electromagnetic signal to a stylus;

receiving, by the screen coil, a second electromagnetic signal from the stylus in response to the first electromagnetic signal;

converting the received second electromagnetic signal into a second current signal; and determining a quantitative distance between the capacitive screen and the stylus based on a magnitude or waveform of the second current signal.

* * * * *